(12) United States Patent
Sigal et al.

(10) Patent No.: US 10,013,621 B2
(45) Date of Patent: Jul. 3, 2018

(54) SYSTEMS AND METHODS FOR IDENTIFYING OBJECTS IN MEDIA CONTENTS

(71) Applicant: Disney Enterprises, Inc., Burbank, CA (US)

(72) Inventors: Leonid Sigal, Pittsburgh, PA (US); Arik Shamir, Jerusalem (IL); Guy Rosenthal, Tel-Aviv (IL)

(73) Assignee: Disney Enterprises, Inc., Burbank, CA (US)

( * ) Notice: Subject to any disclaimer, the term of this patent is extended or adjusted under 35 U.S.C. 154(b) by 169 days.

(21) Appl. No.: 15/285,377

(22) Filed: Oct. 4, 2016

(65) Prior Publication Data

US 2018/0096192 A1   Apr. 5, 2018

(51) Int. Cl.
*G06K 9/00* (2006.01)

(52) U.S. Cl.
CPC ..... *G06K 9/00986* (2013.01); *G06K 9/00671* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,449,258 B1 * | 9/2016 | Palacio | G06K 9/325 |
| 2012/0308121 A1 * | 12/2012 | Datta | G06F 17/3028 |
| | | | 382/155 |
| 2015/0055854 A1 * | 2/2015 | Marchesotti | G06K 9/627 |
| | | | 382/159 |
| 2017/0323184 A1 * | 11/2017 | Philipose | G06K 9/00718 |
| 2018/0060699 A1 * | 3/2018 | Ghazali | G06K 9/6267 |

OTHER PUBLICATIONS

Gupta et al., Beyond Nouns: Exploiting Prepositions and Comparative Adjectives for Learning Visual Classifiers, Springer, Computer Vision—ECCV 2008, Lecture Notes in Computer Science, vol. 5302. (Year: 2008).*

(Continued)

*Primary Examiner* — Justin P Misleh
(74) *Attorney, Agent, or Firm* — Farjami & Farjami LLP (57) ABSTRACT

There is provided a system including a memory and a processor to receive images. The processor is further to train independent detectors for identifying first objects in the images based on individual attributes including a first attribute and a second attribute. The processor is also to train joint detectors for identifying first objects in the images based on composite attributes including a composite attributes each including the first attribute and the second attribute. The processor is to analyze features of the images to determine a difference between a first training performance of the independent detectors and a second training performance of the joint detectors. Lastly, the processor is to select, based on the analyzing, between using the independent detectors and using the joint detectors for identifying second objects in the images using a third attribute and a fourth attribute in the attribute database.

20 Claims, 7 Drawing Sheets

(56) References Cited

OTHER PUBLICATIONS

Li et al., Multi-attribute Learning for Pedestrian Attribute Recognition in Surveillance Scenarios, 3rd IAPR Asian Conference on Pattern Recognition, Kuala Lumpur, 2015, pp. 111-115 (Year: 2015).*

Johnson, J., et al. "Image retrieval using scene graphs" *CVPR*, Jun. 2015. pp. 3668-3678.

Rastegari, et al. *Multi-Attribute Queries: To Merge or Not to Merge?*, IEEE Conference on Computer Vision and Pattern Recognition, Jun. 2013. pp. 3310-3317.

* cited by examiner

SYSTEMS AND METHODS FOR IDENTIFYING OBJECTS IN MEDIA CONTENTS

BACKGROUND

Conventional object recognition schemes enable identification of objects in images based on image attributes and object attributes. Computer vision may be trained to identify parts of an image using independent attributes, such as a noun describing an object or an adjective describing the object, or using composite attributes, such as describing an object using a noun describing the object and an adjective describing the object. However, the conventional schemes do not offer an effective method for identifying some objects. Even more, the conventional schemes are computationally expensive and prohibitively inefficient.

SUMMARY

The present disclosure is directed to systems and methods for identifying objects in media contents, such as images and video contents, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
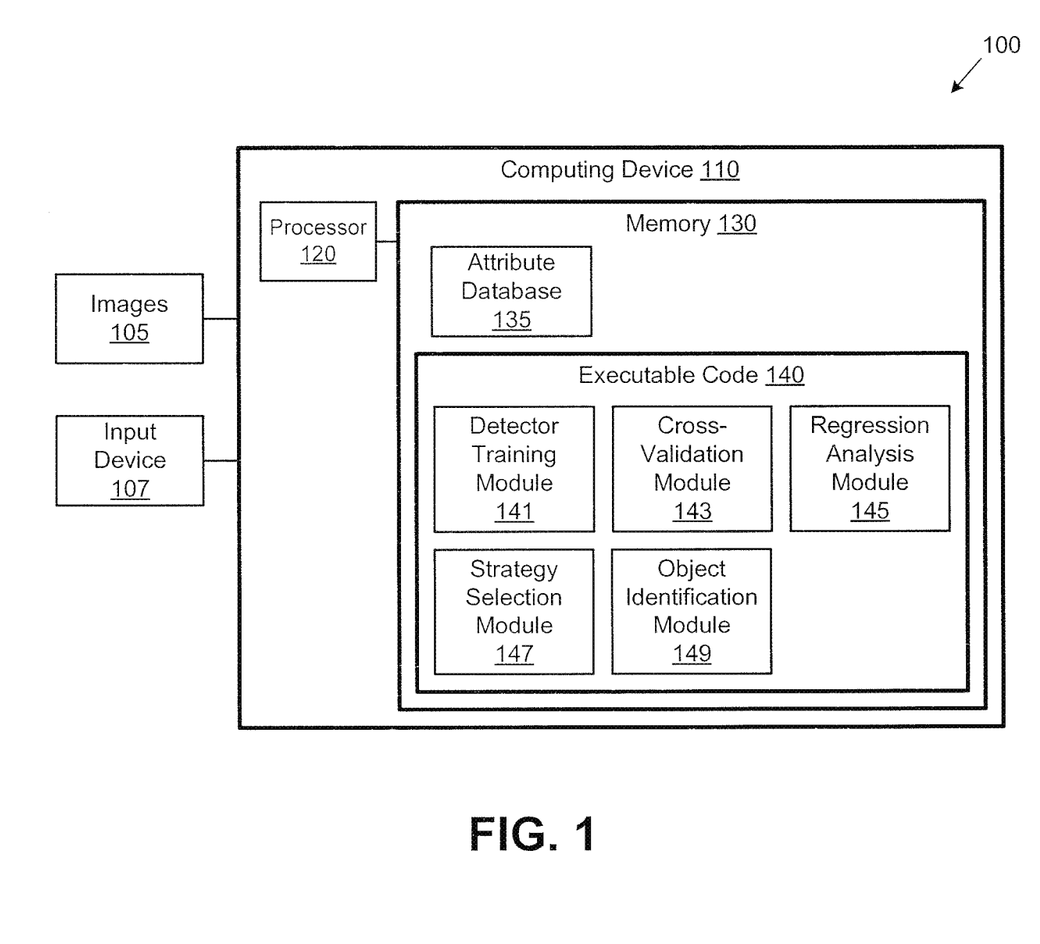
FIG. 1 shows a diagram of an exemplary system identifying objects in media contents, such as images, according to one implementation of the present disclosure.

FIG. 1 shows a diagram of an exemplary system for identifying objects in media contents, such as images and video contents, according to one implementation of the present disclosure. System 100 includes images 105, input device 107, and computing device 110. Images 105 may include a plurality of images including various people, places, objects, activities, etc. Input device 107 may be an input device for receiving input from a user, such as a computer keyboard, mouse, etc. In some implementations, a user may use input device 107 to provide one or more attributes used to search images 105.

Computing device 110 includes processor 120 and memory 130. Processor 120 is a hardware processor, such as a central processing unit (CPU), found in computing device 110. Memory 130 is a non-transitory storage device storing computer code for execution by processor 120, and also for storing various data and parameters. As shown in FIG. 1, memory 130 includes attribute database 135 and executable code 140. Attribute database 135 may include a plurality of attributes that may be used to describe various people, places, objects, activities, etc., depicted in images 105. In some implementations, attribute database 135 may include a predefined set of attributes that may be combined to form a visual composite, where each attribute is one of a noun describing an object or a scene in images 105, an adjective describing a visual attribute of an object in images 105, a preposition and/or verb describing a relationship related to one or more objects in images 105. For example, an image of images 105 may depict a guitar hanging on a wall and over a wooden desk, with a white mouse on the desk and a black chair in front of the desk. Attribute database 135 may include the objects "guitar", "desk", "mouse", and "chair", the attributes "wooden", "white", and "black", and the relationships "hanging", "over", "on", and "in front", and these attributes may be used to form the composites {guitar, hanging}, {hanging, on}, {on, wall}, {hanging, over}, {over, wooden}, {over, desk}, {wooden, desk}, {guitar, on, wall}, {guitar, over, desk}, {over, wooden, desk}, etc. Composites that can be formed using the attributes in attribute database 135 may include individual attributes or a plurality of attributes, such as a composite including two or more attributes.

Executable code 140 may include one or more software modules for execution by processor 120. In some implementations, executable code 140 may identify objects in one or more images of images 105, where each object may be described in terms of one or more characteristics of the object, e.g., executable code 140 may search images 105 for a pink flower. Executable code 140 may search images 105 for an object described by a relationship of the object to another object, e.g., executable code 140 may search images 105 for a plate on a table. In some implementations, training a detector and searching images 105 for an object based on independent detectors, such as an independent detector for the object flower and an independent detector for the attribute pink, and then combining the results, may yield better results. In other implementations, training a detector and searching images 105 for a joint composite, such as the joint composite including both the object "flower" and the attribute "pink", may yield better results. In some implementations, executable code 140 may determine whether an independent detection strategy or a joint detection strategy will be more effective in searching images 105.

As shown in FIG. 1, executable code 140 includes detector training module 141, cross-validation module 143, regression analysis module 145, strategy selection module 147, and object identification module 149. Detector training module 141 is a software module stored in memory 130 for execution by processor 120 to train one or more independent detectors and one or more joint detectors for identifying objects in images 105. In some implementations, detector training module 141 may train a training set of independent detectors on a portion of the attributes in attribute database 135. Detector training module 141 may train a training set of joint detectors on the training set of attributes in attribute database 135. In one implementation, the training set of independent detectors may include a first independent detector for identifying objects having a first attribute and a second independent detector for identifying objects having a second attribute. The training set of joint detectors may include a joint detector for identifying objects having the first attribute and the second attribute. In some implementations, the training set of attributes may include a portion of the attributes in attribute database 135, such as about 10%, 20%, 30%, less than 50%, etc., of the attributes in attribute database 135. Detector training module 141 may be trained on a dataset of fully annotated training images. In some implementations, images 105 may be fully annotated and may be used for training the one or more independent detectors and one or more joint detectors.

Cross-validation module 143 is a software module stored in memory 130 for execution by processor 120 to measure the cross-validation performance of the independent detectors and the joint detectors trained by detector training module 141. In some implementations, cross-validation module 143 may compare results of the independent detectors, results of the joint detectors, and the ground truth of the annotated images to determine which detector provides better results for each composite.

Regression analysis module 145 is a software module stored in memory 130 for execution by processor 120 to analyze results from detector training module 141. In some implementations, regression analysis module 145 may regress the difference in cross-validation performance of the independent detectors and the joint detectors for the training attributes and analyze the results to find a difference between the detectors for each training composite. In one implementation, regression analysis module 145 may use a set of features from the training attributes to regress the difference in cross-validation performance between the independent detector method and the joint detector method. In some implementations, the features may include the number of samples with which detector training module 141 may train each detector, the separability of the attributes, the entropy of image features, etc.

Strategy selection module 147 is a software module stored in memory 130 for execution by processor 120 to select a more effective detector for a given set of attributes based on the results of regression analysis module 145. In some implementations, strategy selection module 147 may compare results of regression analysis module 145 to determine that either the independent detection strategy or the joint detection strategy is better for each of the training composites. Based on the results of the training composites, strategy selection module 147 may predict whether to use an independent detection strategy or a joint detection strategy on new composites. Object identification module 149 is a software module stored in memory 130 for execution by processor 120 to identify objects in images 105 based on the more effective detector selected by strategy selection module 147. Object identification module 149 may search images 105 for a new composite based using the detection strategy predicted by strategy selection module 147.

Figure 2:
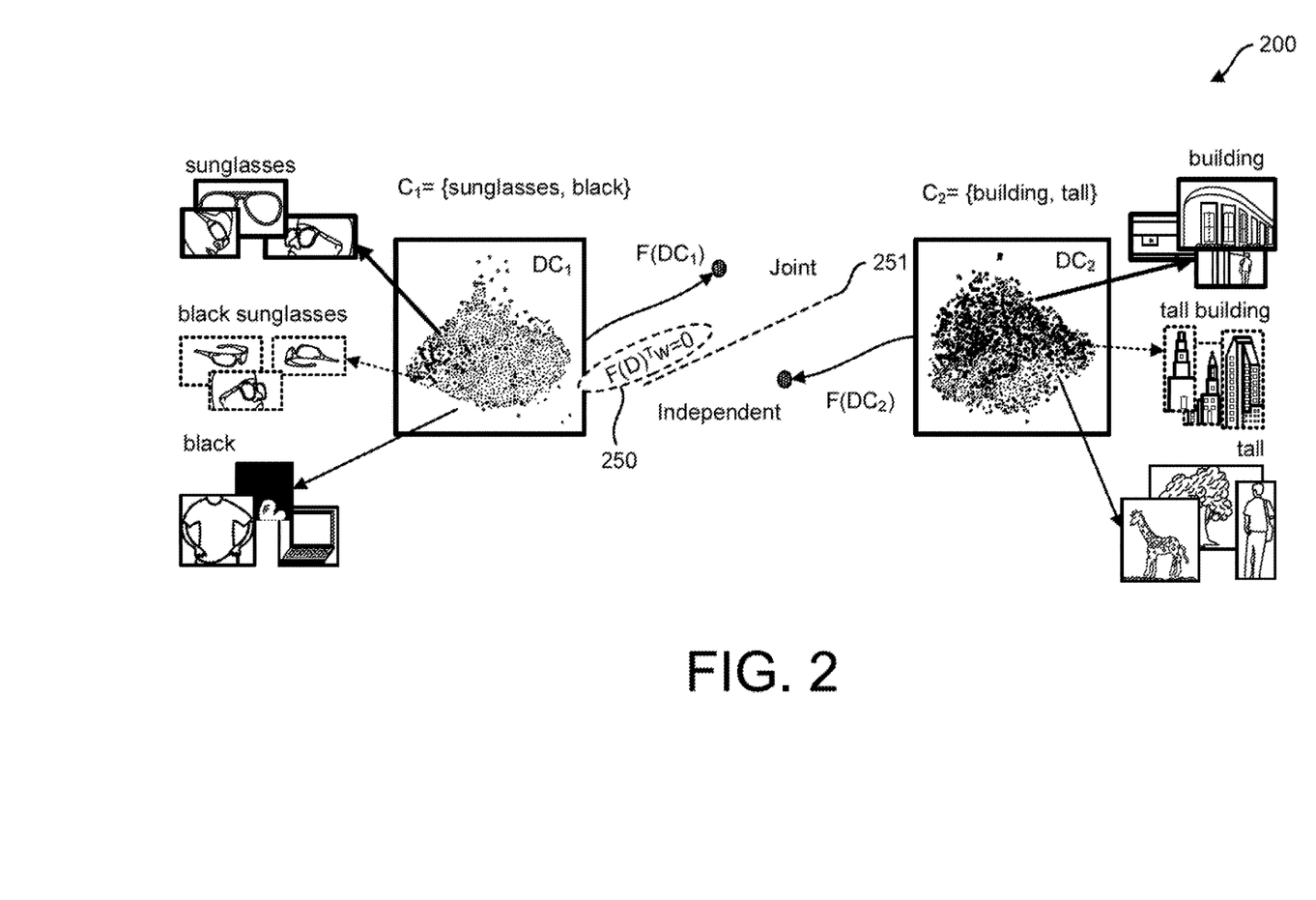
FIG. 2 shows a diagram of exemplary selection of strategies identified based on features extracted from training data, according to one implementation of the present disclosure.

FIG. 2 shows a diagram of exemplary selection of strategies identified based on features extracted from training data, according to one implementation of the present disclosure. Diagram 200 shows visual composite $C_1$ and visual composite $C_2$. Executable code 140 may represent each image, or an image patch, i using a feature vector $x_i \in R^{4096}$ from the last fully-connected layer (fc7) of a convolutional neural network (CNN). FIG. 2 additionally shows corresponding training data $D_{C_1}$ and $D_{C_2}$, illustrated by a t-distributed stochastic neighbor embedding (tSNE) plot of the CNN image features. Statistical features $F(D_{C_1})$ are extracted from $D_{C_1}$, and statistical features $F(D_{C_2})$ are extracted from $D_{C_2}$. The resulting vectors may be used to determine which training strategy should be used for each specific composite, based on regression function 250. The threshold determined by regression function 250 is shown by the dotted line 251 separating joint detectors from independent detectors. Based on the results of regression function 250, system 100 should train "black sunglasses" as a joint phrase and "tall building" as an independent product of "tall" and "building" attributes.

Figure 3A:
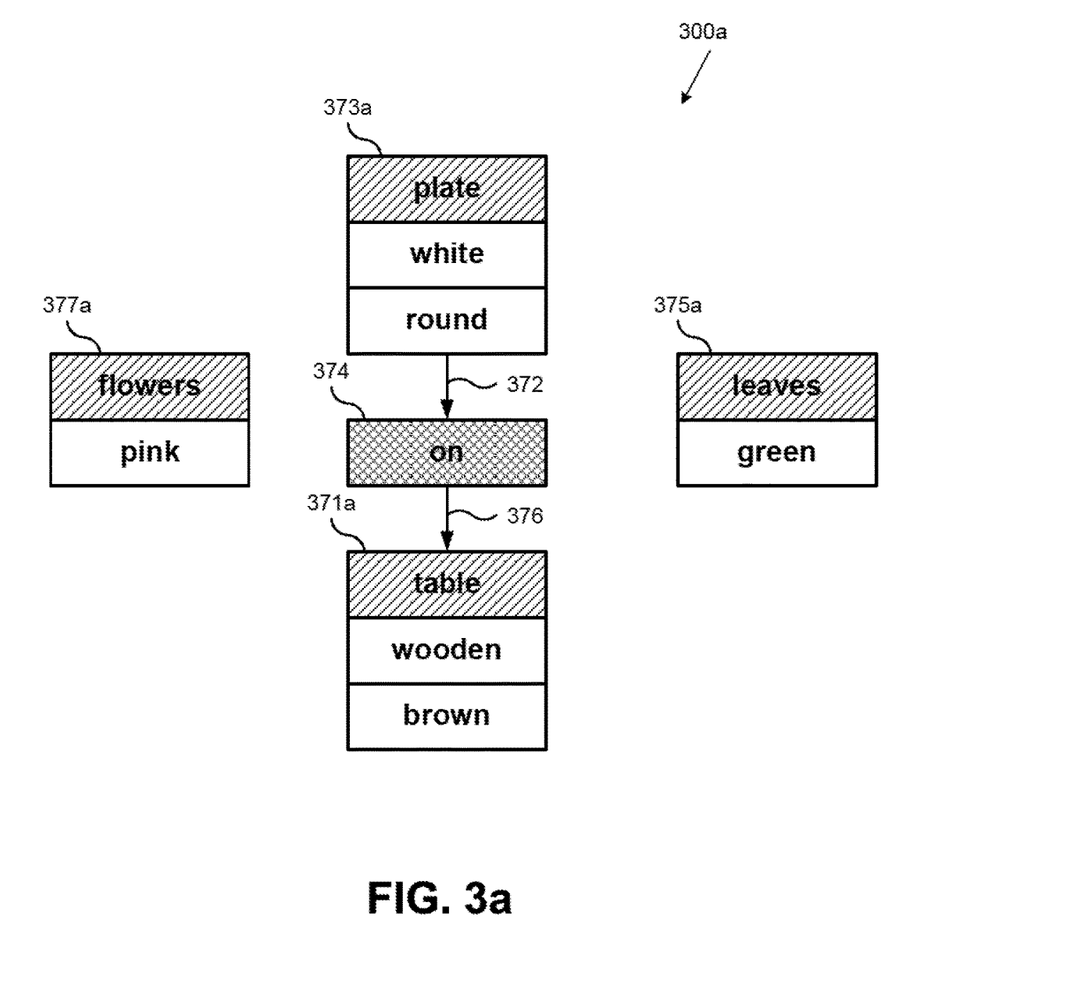
FIG. 3a shows an exemplary scene graph of an image, according to one implementation of the present disclosure.

FIG. 3a shows an exemplary scene graph of an image, according to one implementation of the present disclosure. Diagram 300a includes node 371a, including the object "table" described by the adjectives "wooden" and "brown". Node 374 is the relationship "on". Edge 372, connecting node 373a and node 374, and edge 376, connecting node 374 and node 371a, indicate the relationship between the objects described by the nodes, and the arrows on edges 372 and 376 indicate the order of the objects with respect to the relationship. Node 373a includes the object "plate" described by the adjectives "white" and "round". Node 375a includes the object "leaves" having the attribute "green". Node 377a includes the object "flowers" having the attribute "pink". Accordingly, the graph shown in FIG. 3a describes an image of a white round plate on a brown wooden table, pink flowers, and green leaves.

Figure 3B:
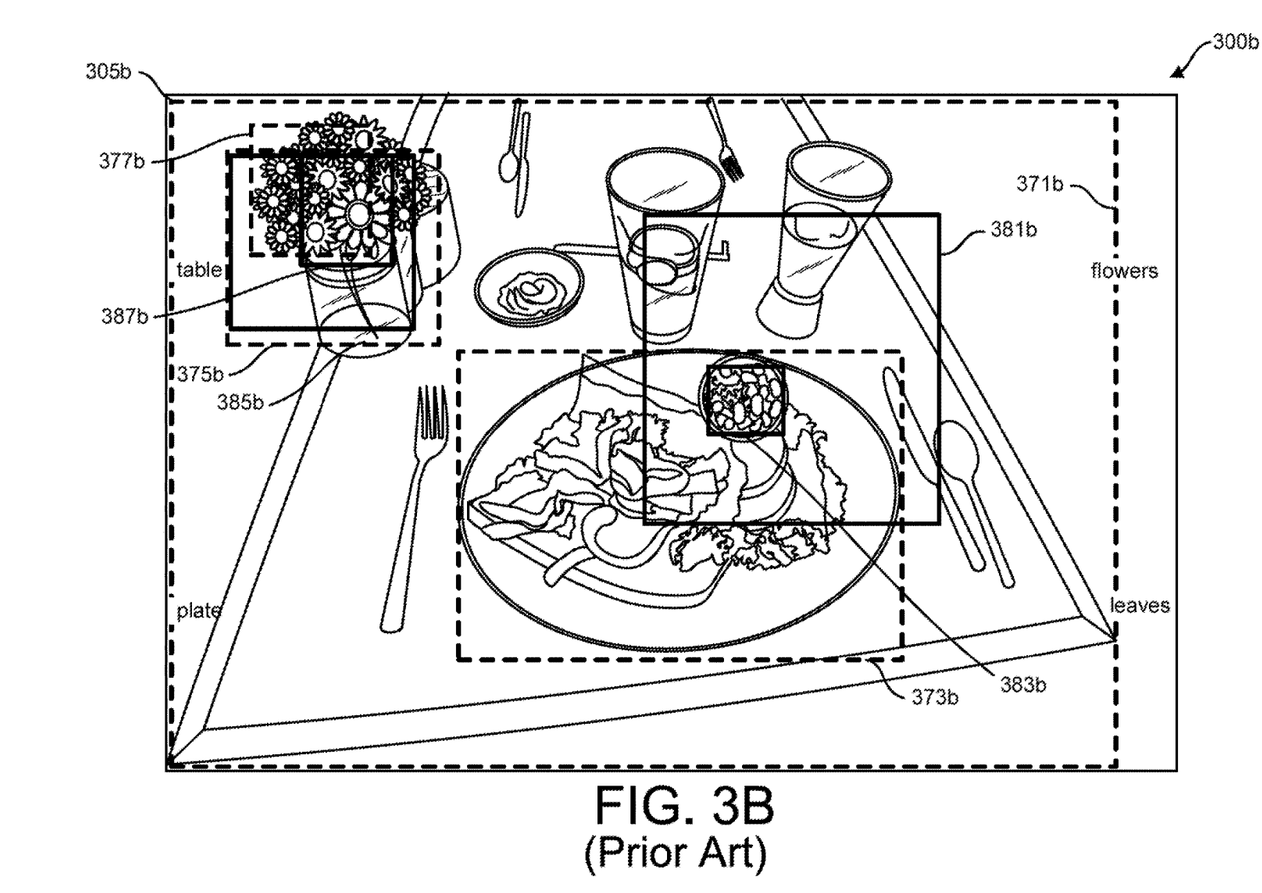
FIG. 3b shows an exemplary identification of objects in the image corresponding to the scene graph of FIG. 3a based on a conventional identification strategy.

FIG. 3b shows an exemplary identification of objects in the image corresponding to the scene graph of FIG. 3a based on a conventional detection strategy. Diagram 300b includes image 305b with bounding boxes 371b, 373b, 375b, and 377b, which are ground truth annotations of image 305b. Box 371b indicates the ground truth annotation for the object "table." Box 373b indicates the ground truth annotation for the object "plate." Box 375b indicates the ground truth annotation for the object "leaves." Box 377b indicates the ground truth annotation for the object "flowers." Boxes 381b, 383b, 385b, and 387b indicate the results of object identification using an independent detection strategy. Box 381b indicates the object "table" as identified using an independent detection strategy. Box 383b indicates the object "plate" as identified using an independent detection strategy. Box 385b indicates the object "leaves" as identified using an independent detection strategy. Box 387b indicates the object "flowers" as identified using an independent detection strategy.

Figure 3C:
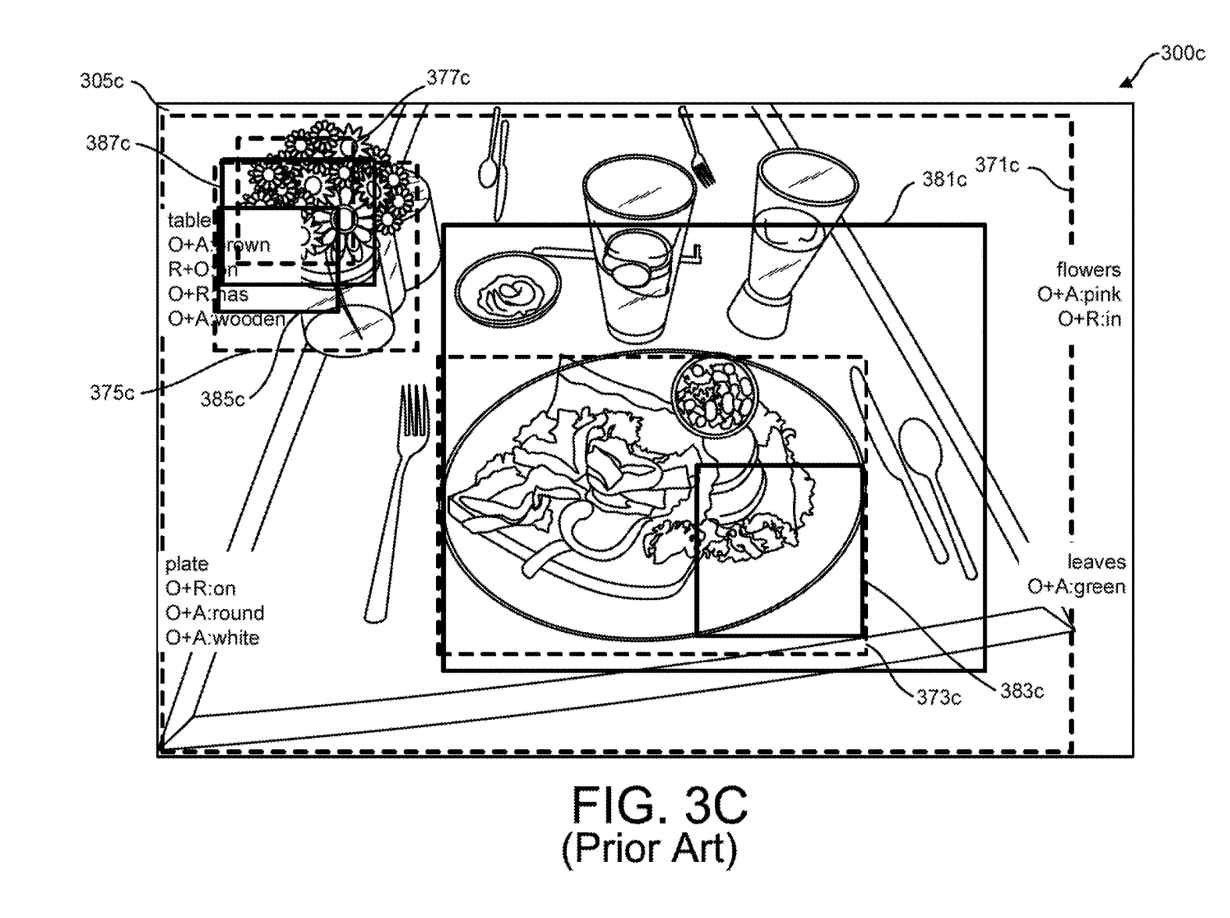
FIG. 3c shows another exemplary identification of objects in the image corresponding to the scene graph of FIG. 3a based on another conventional identification strategy.

FIG. 3c shows an exemplary identification of objects in the image corresponding to the scene graph of FIG. 3a based on another conventional identification strategy. Diagram 300c includes image 305c with bounding boxes 371c, 373c, 375c, and 377c, which are ground truth annotations of image 305c, corresponding to the ground truth annotations of image 300b. Boxes 381c, 383c, 385c, and 387c indicate the results of object identification using a joint composite detection strategy. Box 381c indicates the portion of image 305c identified using the joint composites {table+brown}, {on+table}, {table+has}, and {table+wooden}, as identified using a joint composite detection strategy. Box 383c indicates the portion of image 305c identified using the joint composites {plate+on}, {plate+round}, and {plate+white}, as identified using a joint composite detection strategy. Box 385c indicates the portion of image 305c identified using the joint composites {leaves+green}, as identified using a joint composite detection strategy. Box 387c indicates the portion of image 305c identified using the joint composites {flowers+pink} and {flowers+in}, as identified using a joint composite detection strategy.

Figure 3D:
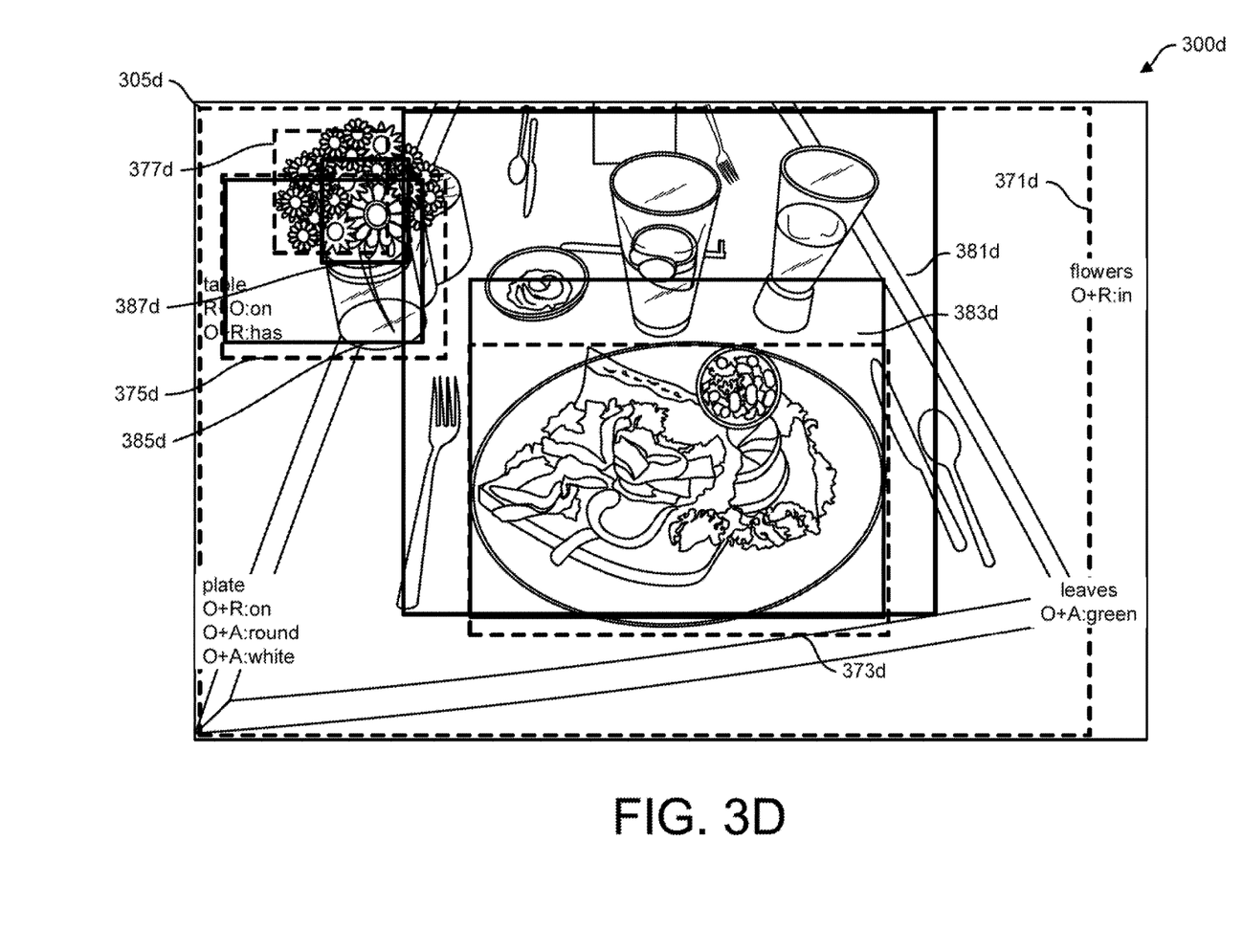
FIG. 3d shows another exemplary identification of objects in the image corresponding to the scene graph of FIG. 3a based on an identification strategy, according to one implementation of the present disclosure.

FIG. 3d shows an exemplary identification of objects in the image corresponding to the scene graph of FIG. 3a based on an identification strategy, according to one implementation of the present disclosure. Diagram 300d includes image 305d with bounding boxes 371d, 373d, 375d, and 377d, which are ground truth annotations of image 305d, corresponding to the ground truth annotations of images 300b and 300c. Boxes 381d, 383d, 385d, and 387d indicate the results of object identification using the method of selecting the objects, according to the present disclosure. Box 381d indicates the portion of image 305d identified using the joint composites {on+table} and {table+has}, as identified using the method disclosed herein. Box 383d indicates the portion of image 305c identified using the joint composites {plate+on}, {plate+round}, and {plate+white}, as identified using the method disclosed herein. Box 385d indicates the portion of image 305c identified using the joint composites {leaves+green}, as identified using the method disclosed herein. Box 387d indicates the portion of image 305c identified using the joint composites {flowers+in}, as identified using the method disclosed herein.

Figure 4:
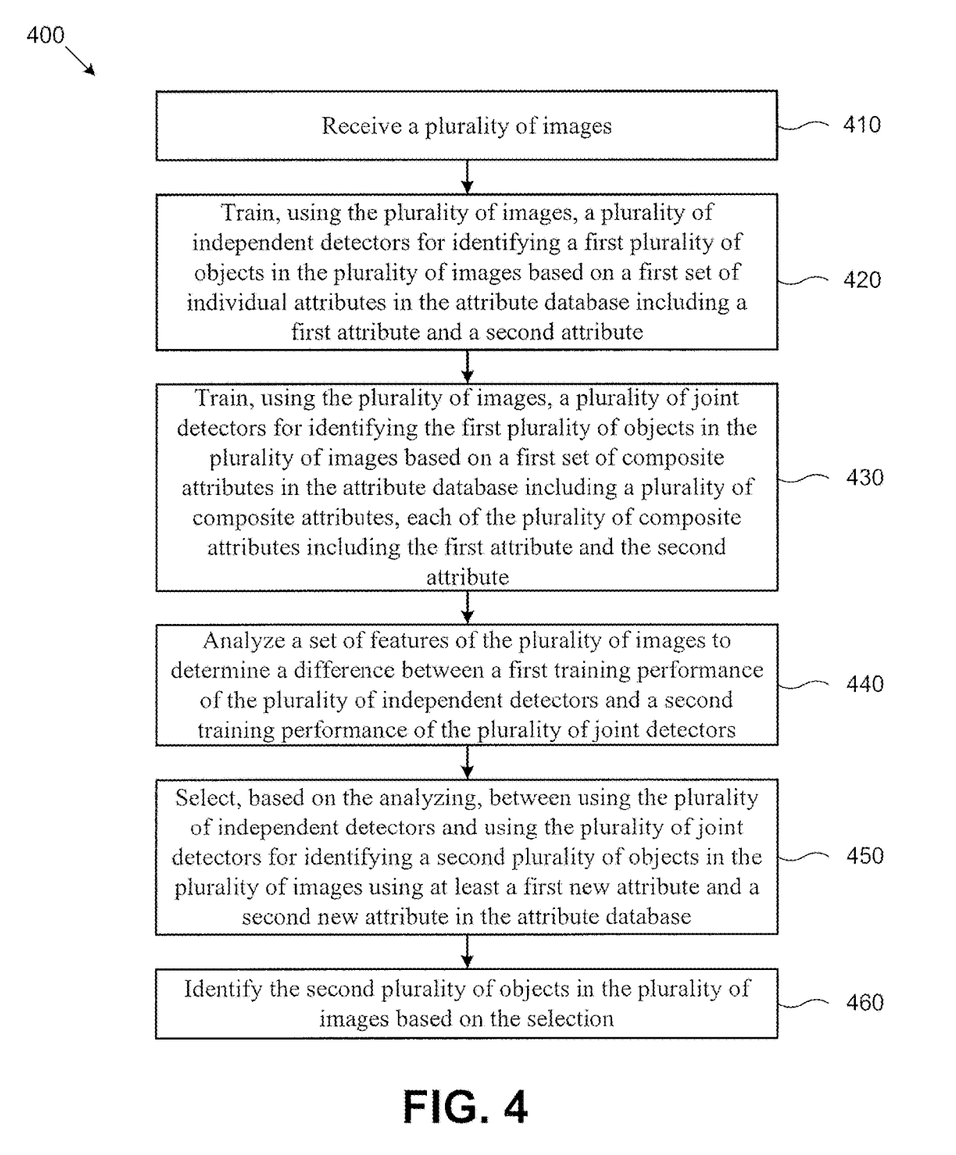
FIG. 4 shows a flowchart illustrating an exemplary method of identifying objects in media contents, such as images, according to one implementation of the present disclosure.

FIG. 4 shows a flowchart illustrating an exemplary method of identifying objects in media contents, such as images and video contents, according to one implementation of the present disclosure. Method 400 begins at 410, where executable code 140 receives a plurality of images including one or more objects each having a plurality of attributes including at least a first attribute and a second attribute. Executable code 140 may represent each image i of images 105 using a feature vector $x_i \in R^{4096}$ from the last fully-connected layer (fc7) of a CNN network. In some implementations, executable code 140 may represent a portion of an image using a feature vector $x_i \in R^{4096}$ from the last fully-connected layer (fc7) of a CNN network.

At 420, executable code 140 trains, using the plurality of images, a plurality of independent detectors for identifying a first plurality of objects in the plurality of images based on a first set of individual attributes in attribute database 135 including a first attribute and a second attribute. For detection and grounding, detector training module 141 may use the SceneGraph dataset, as introduced by Johnson, J., Krishna, R., Stark, M., Li, L. J., Shamma, D. A., Bernstein, M. S., Fei-Fei, L. in their paper "Image retrieval using scene graphs" in CVPR, 2015. SceneGraph dataset consists of five thousand (5,000) images containing a large number of objects, attributes, and relationship annotations. In one implementation, detector training module 141 may use four thousand (4,000) images for training and one thousand (1,000) images for testing. For scene classification, detector training module 141 may use the SUN dataset, commonly available on the Internet, comprising 14,340 images from 707 scene categories and annotated with one-hundred-and-two (102) discriminative attributes. In addition, to get more samples for each scene category, detector training module 141 may augment each scene class in SUN Attribute with up to additional eighty (80) images from the full SUN dataset, or less if eighty (80) are unavailable.

Detector training module 141 may train an independent detector using a linear support vector machine (SVM), and further calibrate the SVM scores to obtain probability estimates. The calibration may be implemented using Platt scaling:

$$P(y_c = 1 \mid x_i) = \frac{1}{1 + e^{\alpha_c(w_c^T x_i + b_c) + \beta_c}}$$

where $\alpha_c$, $\beta_c$ are the calibration coefficients; $w_c$ and $b_c$ are the learned SVM weights and bias, respectively, for class c.

In some implementations, executable code 140 may use labeled bounding boxes containing objects as positive samples for use object detection. Executable code 140 may use a CNN adapted for detection tasks to compute $x_i$. In some implementations, executable code 140 may use labeled full images and a neural network fine-tuned for scene classification to define positive samples for scene classification. For both object detection and scene detection, executable code 140 may extract negative patches/images from the training data. In one implementation, executable code 140 may perform multiple rounds of retraining using hard negative mining for further learning refinement.

For example, consider a visual composite $C \in \mathbb{C}$ consisting of N attributes, i.e., $C = \{c_1, c_2, \ldots, c_N\}$, where each attribute, $c_i \in \{O, A, R\}$, is an attribute from attribute database 135. Each attribute in C may be a noun from a predefined set of noun object or scene object categories O, e.g., "man", "horse", an adjective from a set of visual characteristics describing objects or scenes A, e.g., "tall", "bold", "open", or a preposition and/or a verb from a set of predefined object relationships R, e.g., "in", "next to", "holding", "riding".

In another example, the composite "man holding phone", $C = \{c_1 = o_1 = \text{"man"} \in O, c_2 = r = \text{"holding"} \in R, c_3 = o_2 = \text{"phone"} \in O\}$. To search images 105 for C, executable code 140 may treat each attribute independently:

$$b_1^*, b_2^* = \underset{b_1, b_2}{\operatorname{argmax}} P(y_C = 1 \mid x)$$
$$= \underset{b_1, b_2}{\operatorname{argmax}} P(y_{o_1} = 1 \mid x_{b_1}) P(y_{o_2} = 1 \mid x_{b_2}) P(b_1, b_2 \mid r)$$

where $b_1$ and $b_2$ are the bounding boxes for $o_1$ and $o_2$, respectively, $x_{b_1}$ and $x_{b_2}$ are corresponding CNN features of the image patches enclosed by these bounding boxes and $P(b_1, b_2 \mid r)$ is a spatial distribution for relationship r (e.g., a Gaussian mixture model), designed to encode spatial consistency between two object patches.

Alternatively, executable code 140 may treat C as a joint composite. At 430, executable code 140 trains, using the plurality of images, a plurality of joint detectors for identifying the first plurality of objects in the plurality of images based on a first set of composite attributes in attribute database 135 including a plurality of composite attributes, each of the plurality of composite attributes including the first attribute and the second attribute.

In some implementations, detecting "man holding phone" may be represented as composite attributes in the following ways:

$$b_1^*, b_2^* = \underset{b_1, b_2}{\operatorname{argmax}} P(y_{o_1} = 1 \mid x_{b_1}) P(y_{o_2+r} = 1 \mid x_{b_2}) P(b_1, b_2 \mid r), \quad (2)$$

$$= \underset{b_1, b_2}{\operatorname{argmax}} P(y_{o_1+r} = 1 \mid x_{b_1}) P(y_{o_2} = 1 \mid x_{b_2}) P(b_1, b_2 \mid r), \quad (3)$$

$$= \underset{b_1, b_2}{\operatorname{argmax}} P(y_{o_1+r} = 1 \mid x_{b_1}) P(y_{o_2+r} = 1 \mid x_{b_2}) P(b_1, b_2 \mid r), \quad (4)$$

$$= \underset{b_1, b_2}{\operatorname{argmax}} P(y_{o_1+r+o_2} = 1 \mid x_{b_1, b_2}), \quad (5)$$

where, for example, $P(y_{o_1=r} = 1 \mid x_{b_1})$ and $P(y_{o_2=r} = 1 \mid x_{b_2})$ are classifiers trained to detect "man holding" and "holding phone" composites attributes respectively. The difference in these formulations is that each assumes less appearance independence, from top to bottom.

To train the corresponding joint detectors, detector training module 141 may use a training set of images, which may be a subset of images 105. In some implementations, training set of images may comprise a fully supervised setting with an annotated dataset of N training images, $D_{O,A}=\{(b_{i,j},I_{i,j})\}$, where $i\in[1,N]$ is the image index and $j\in[1,B_i]$ is defined over a set of $B_i$ annotated regions in i. The variable $b_{i,j}\in R^4$ may denote the bounding box of the corresponding image region, and $I_{i,j}=(o_{i,j},a_{i,j})$ may denote the set of assigned labels, where $o_{i,j}\in O$ is an object label and $a_{i,j}=\{a_{i,j,k}\}$ is a potentially empty set of characteristics $a_{i,j,k}\in A$ taken from an characteristics set A, where $K_{i,j}$ is the total number of characteristics assigned to region j in image i, and $k\in[1,K_{i,j}]$. For example, for a region j in image i labeled "tall old person", $K_{i,j}=2$ and $I_{i,j}=$(person, {tall, old}). In addition, each pair of bounding box annotations in a given image i can be associated with a set of relationship, such that $D_R=\{(b_{i,j},b_{j,k},r_{i,j,k})\}$. For example, annotation "person holding and swinging the racket" would correspond to $r_{i,j,k}=$ {holding, swinging}.

Further, strategy selection module 147 may define data subsets:

$$\mathcal{D}_{O=\hat{o}}=\{(b_{i,j},I_{i,j})|\forall i,\forall j \text{ s.t. } o_{i,j}=\hat{o}\},$$

$$\mathcal{D}_{A=\hat{a}}=\{(b_{i,j},I_{i,j})|\forall i,\forall j,\exists k \text{ s.t. } a_{i,j,k}=\hat{a}\},$$

$$\mathcal{D}_{R=\hat{r}}=\{(b_{i,j},b_{i,k},r_{i,j,k})|\forall i,\forall j,\exists k \text{ s.t. } r_{i,j,k}=\hat{r}\},$$

$$\mathcal{D}_{O=\hat{o},A=\hat{a}}=\mathcal{D}_{O=\hat{o}}\cap\mathcal{D}_{A=\hat{a}}; \mathcal{D}_{O=\hat{o},R=\hat{r}}=\mathcal{D}_{O=\hat{o}}\cap\mathcal{D}_{R=\hat{r}}$$

In some implementations, for the scene-attribute scenario, the setting may be simplified by setting $b_{i,j}$ to full images, thus eliminating the $D_R$ equation. Overall, executable code 140 may consider the following choices of joint detector vs. independent detector selections:

- scene-attribute: strategy selection module 147 may choose between $P(y_s=1|x) P(y_a=1|x)$ and $P(y_{s+a}=1|x)$ trained with $D_{O=s}$, $D_{A=a}$ and $D_{O=s,A=a}$, respectively.
- object-attribute: strategy selection module 147 may choose between $P(y_o=1|x_b) P(y_a=1|x_b)$ and $P(y_{o+a}=1|x_b)$ trained with $D_{O=o}$, $D_{A=a}$ and $D_{O=o,A=a}$, respectively.
- object-relationship-object: where strategy selection module 147 may choose among the choices denoted in Equations (1)-(4) and trained with respective data subsets.

At 440, executable code 140 analyzes a set of features of the plurality of images to determine a difference between a first training performance of the plurality of independent detectors and a second training performance of the plurality of joint detectors. In some implementations, the analysis may involve a regression analysis of the set of features of the plurality of images. For example, regression analysis module 145 may use the set of features of the corresponding training samples to regress the difference in a cross-validation performance between the first training performance and the second training performance. In some implementations, the features may include the number of samples with which detector training module 141 may train each detector, the separability of the attributes, the entropy of image features in the training images, etc. The learned regressor may then serve as a predictor on new composites to choose which strategy to use for the remainder of the composites.

Regression analysis module 145 may let $S=\{I, J_1, J_2, \ldots, J_M\}$ denote the set of M+1 possible training strategies, where I and $\{J_m\}_{m-1}^M$ are the independent and (possibly multiple) joint strategies, respectively. $P_s(y_C|x)$ may be the resulting trained classifier for composite C with strategy s. By applying $P_s(y_C|x)$ on a validation set, executable code 140 may obtain a validation accuracy, $V_{s,C}$. Regression analysis module 145 may train a regressor to predict $V_{s,C}$ from the features of the data sub-set $D_C$ that is used for training $P_s(y_C|x)$ directly. Regression analysis module 145 may define a feature mapping $f_C=F(D_C)$. In other implementations, regression analysis module 145 may predict the differences $V_{J_m,C}-V_{I,C}$, instead of each $V_{s,C}$, learning a linear prediction models as follows:

$$w_m = \underset{w}{\operatorname{argmin}}\sum_{C=1}^{|C_{tr}|}(f_C^T w - [V_{J_m,C} - V_{I,C}])^2 + \lambda\|w\|_2^2, \quad (6)$$

where the second term is a regularizer with a weight λ, which may be assigned a small regularizer value, such as 0.01. In some implementations, regression analysis module 145 may determine the difference in performance between the independent detectors and each available joint detector, measured on a validation set.

At 450, executable code 140 select, based on the analyzing, between using the plurality of independent detectors and using the plurality of joint detectors for identifying a second plurality of objects in the plurality of images using at least a first new attribute and a second new attribute in the attribute database. In one implementation, the selection may be based on the regression analysis of the set of features of the plurality of images. Based on the learned regression, when observing a new composite $C_{new}$, strategy selection module 147 may select the strategy, $s_{new}\in S$ according to the following prediction rule, which may not require training of different strategies for $C_{new}$ or evaluation of resulting classifiers on validation data:

$$s_{new} = \begin{cases} J_{m^*} & \text{if } f_{C_{new}}^T w_{m^*} > 0 \\ I, & \text{otherwise} \end{cases}, \text{ where } m^* = \underset{m}{\operatorname{argmax}} f_{C_{new}}^T w_m. \quad (7)$$

The above formulation predicts an independent detection strategy (I) when it is predicted to outperform all joint strategies, otherwise, a joint detection strategy, with largest predicted margin of improvement ($J_{m^*}$) is returned.

In some implementations, the topology of training examples for a given composite may contain informative cues for the strategy selection. The feature selection may capture the trade-off between cardinality and compactness of the samples. In some implementations, the data subset $D_c$ may be used for a single composite part, where $D_c$ is the data subset for a single composite part or attribute. Executable code 140 may extract a feature vector $f_c=[f_{c,1}, f_{c,2}, \ldots, f_{c,6}]\in R^6$ from $D_c$. In some implementations, $f_c$ may comprise the number of samples, $f_{c,1}=|D_c|$, a compactness of samples, which may be represented as statistics extracted from pairwise distances: $r=\{|x_i-x_j|\}$, $i\neq j$, $x\in D_c$ encoded by $f_{c,2}$=max(r), $f_{c,3}$=min(r), $f_{c,4}$=med(r), $f_{c,5}$=mean(r), where r may be calculated using a cosine distance, and a sample entropy, estimated using nearest neighbor distance approximation:

$$f_{c,6} = \frac{1}{N}\sum_{i=1}^{N} \ln(N\rho_i) + \ln 2 + \gamma, \text{ where } \rho_i = \min_{j\neq i}|x_i - x_j|$$

where $\gamma$ is the Euler constant. In some implementations, executable code 140 may repeat this process for each of the independent attributes and the corresponding joint composites and concatenate the resulting features to obtain a unified feature. For example, for C={white, boat}, F(D$_C$)=[f$_{boat}$, f$_{white}$,f$_{white+boat}$]. In some implementations, strategy selection module 147 may dynamically learn how to weight various contributing features to make a prediction about which attribute detector strategy to use in each case. In some implementations, each contributing feature may be weighted. Method 400 continues at 460, executable code 140 identifies the second plurality of objects in the plurality of images based on the selection. In one implementation, identifying the second plurality of objects in the plurality of images may include identifying a first object in the second plurality of objects using individual attributes and identifying a second object in the second plurality of objects using composite attributes.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a non-transitory memory storing an attribute database; and
   a hardware processor executing an executable code to:
   receive a plurality of images;
   train, using the plurality of images, a plurality of independent detectors for identifying a first plurality of objects in the plurality of images based on a first set of individual attributes in the attribute database including a first attribute and a second attribute;
   train, using the plurality of images, a plurality of joint detectors for identifying the first plurality of objects in the plurality of images based on a first set of composite attributes in the attribute database including a plurality of composite attributes, each of the plurality of composite attributes including the first attribute and the second attribute;
   analyze a set of features of the plurality of images to determine a difference between a first training performance of the plurality of independent detectors and a second training performance of the plurality of joint detectors; and
   select, based on the analyzing, between using the plurality of independent detectors and using the plurality of joint detectors for identifying a second plurality of objects in the plurality of images using at least a first new attribute and a second new attribute in the attribute database.

2. The system of claim 1, wherein the first attribute is one of a first noun, a first adjective, a first preposition, and a first verb.

3. The system of claim 2, wherein the second attribute is one of a second noun, a second adjective, a second preposition, and a second verb.

4. The system of claim 3, wherein the first set of individual attributes and the first set of composite attributes further include a third attribute.

5. The system of claim 4, wherein the third attribute is one of a third noun and a third adjective.

6. The system of claim 1, wherein the hardware processor further executes the executable code to:
   identify the second plurality of objects in the plurality of images based on the selection.

7. The system of claim 1, wherein the plurality of independent detectors and the plurality of joint detectors are trained on less than 50% of the attributes in the attribute database.

8. The system of claim 1, wherein the set of features includes at least one of a number of training images, a separability of the first attribute and the second attribute, and an entropy of the plurality of images.

9. The system of claim 8, wherein each feature in the set of features is weighted.

10. The system of claim 1, wherein the first attribute is a scene attribute.

11. A method for use with a system including a non-transitory memory and a hardware processor, the method comprising:
    receiving, using the hardware processor, a plurality of images;
    training, using the hardware processor, using the plurality of images, a plurality of independent detectors for identifying a first plurality of objects in the plurality of images based on a first set of individual attributes in the attribute database including a first attribute and a second attribute;
    training, using the hardware processor, using the plurality of images, a plurality of joint detectors for identifying the first plurality of objects in the plurality of images based on a first set of composite attributes in the attribute database including a plurality of composite attributes, each of the plurality of composite attributes including the first attribute and the second attribute;
    analyzing, using the hardware processor, a set of features of the plurality of images to determine a difference between a first training performance of the plurality of independent detectors and a second training performance of the plurality of joint detectors;
    selecting, using the hardware processor and based on the analyzing, between using the plurality of independent detectors and using the plurality of joint detectors for identifying a second plurality of objects in the plurality of images using at least a first new attribute and a second new attribute in the attribute database.

12. The method of claim 11, wherein the first attribute is one of a first noun, a first adjective, a first preposition, and a first verb.

13. The method of claim 12, wherein the second attribute is one of a second noun, a second adjective, a second preposition, and a second verb.

14. The method of claim 13, wherein the first set of individual attributes and the first set of composite attributes further include a third attribute.

15. The method of claim 14, wherein the third attribute is one of a third noun and a third adjective.

16. The method of claim 11, further comprising:
identifying, using the hardware processor, the second plurality of objects in the plurality of images based on the selection.

17. The method of claim 11, wherein the plurality of independent detectors and the plurality of joint detectors are trained on less than 50% of the attributes in the attribute database.

18. The method of claim 11, wherein the set of features includes at least one of a number of training images, a separability of the first attribute and the second attribute, and an entropy of the plurality of images.

19. The method of claim 18, wherein each feature in the set of features is weighted.

20. The method of claim 11, wherein the first attribute is a scene attribute.

* * * * *